D. E. GOODENBERGER.
METHOD OF MANUFACTURING SOLID TIRES.
APPLICATION FILED OCT. 5, 1918.
1,392,576.
Patented Oct. 4, 1921.
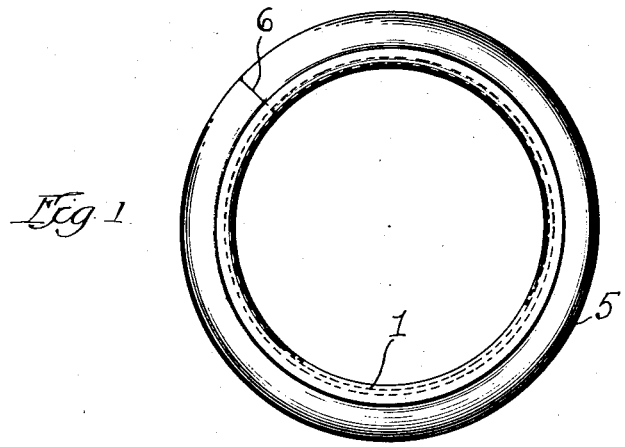
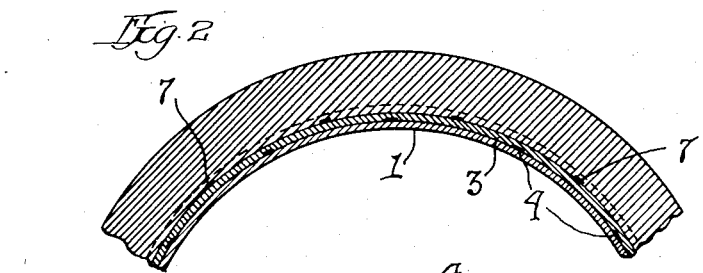
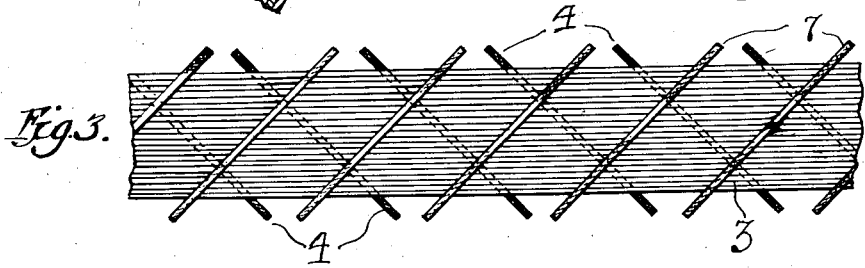
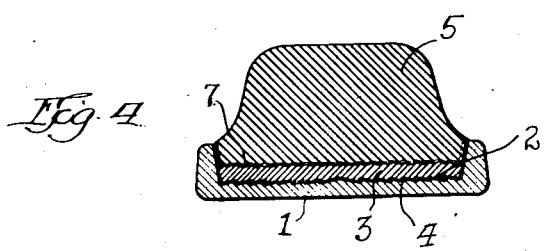
WITNESS
INVENTOR.
Daniel E. Goodenberger
BY
ATTORNEY

UNITED STATES PATENT OFFICE.

DANIEL E. GOODENBERGER, OF AKRON, OHIO, ASSIGNOR TO THE FIRESTONE TIRE AND RUBBER COMPANY, OF AKRON, OHIO, A CORPORATION OF OHIO.

METHOD OF MANUFACTURING SOLID TIRES.

1,392,576. Specification of Letters Patent. Patented Oct. 4, 1921.

Application filed October 5, 1918. Serial No. 256,933.

*To all whom it may concern:*

Be it known that I, DANIEL E. GOODENBERGER, a citizen of the United States, residing at Akron, in the county of Summit, State of Ohio, have invented certain new and useful Improvements in Methods of Manufacturing Solid Tires, of which the following is a specification.

This invention has for its object the improvement of the methods in use in the manufacture of solid tires and is for the purpose of remedying a difficulty present in the manufacture of these tires. The method herein described is for use particularly in conjunction with the method of manufacture of solid tires described in the patent to William C. Stevens No. 1,276,821, August 27, 1918, to which attention is directed, although its use is not in any manner confined to such process, but may be used with other processes of manufacture of solid rubber tires. Nor is the invention limited for use in the manufacture of solid tires alone, but may be extended into other fields of the rubber industry.

In the manufacture of solid tires in accordance with the Stevens process, or other processes, it frequently happens that pockets of air are trapped between the different portions of the tire, and these pockets, being compressed during vulcanization of the tire, form bubbles or blisters on the tires when removed from the mold which render the tires unfit for service. In the manufacture of "hard base" tires, in which a layer of hard rubber is interposed between the tread portion of the tire and the rim, air is frequently trapped between the "hard base" and the rim and between the "hard base" and the tread, and unless such air is removed, the tire will be rendered worthless.

By my invention herein described, I propose to allow the trapped air in the tire to escape by a very simple expedient, which works perfectly to accomplish the ends desired.

In the drawings:

Figure 1 shows a solid tire ready for vulcanizing.

Fig. 2 is a longitudinal section through the tire and rim.

Fig. 3 is a plan view of the "hard base."

Fig. 4 is a cross section through the tire and rim.

In the drawings 1 represents the metallic rim, which may be of any approved type, in this instance being shown as a channel rim, which is designed to be pressed on the wheel. The upper or tire surface of the rim is formed with a series of corrugations or irregularities in order that the base may adhere thereto. In the drawing I have shown the corrugations in the form of saw teeth 2, but they may take the form of dovetailed ridges as well known in the art or any other suitable shape, the principal function being that irregularities afford surfaces into which the base of the tire may enter to grip the rim.

The "hard base" is shown at 3, and comprises a layer of hard rubber compound which may be formed by the process of extrusion, cut to the right length, and rolled in place on the rim, which has been prepared to receive it in any well known manner.

Before the base is applied to the rim, provision is made for venting the air which may become entrapped between the base and the rim. This is done according to my process by interposing between the base and the rim a number of venting elements which afford a means of communication from the center of the tire to the outer surface, so that when the tire is placed in the mold and pressure and heat applied, the pocketed air may escape from the interior of the tire and out of the mold. The means provided by me consists of a number of strings or tapes 4 which are laid transversely of the "hard base" and are long enough to extend slightly beyond the edges of the tire. These venting elements are usually twine or tape, the essential feature being that they are loosely woven so that the air in the interior of the tire may find its way to the venting elements and escape through their interstices.

The strings may be stuck on to the rim before the base is applied, or, if the base is extruded in a ribbon, they may be applied to the underside of the latter before application to the rim. The strings are shown in the drawing closer together than may be necessary and as arranged diagonally to the base, but it is to be understood that the number and arrangement of the venting elements are not essential and may be varied without destroying the efficacy of the invention.

The tread is indicated by the numeral 5 and may be formed in any desired fashion.

It is, however, preferred that it be formed by the process of extrusion in the manner set forth in the Stevens patent above referred to, in which case a length sufficient to encompass the rim is cut off and wrapped around the rim, the meeting ends being tightly pressed or rolled together as at 6. Between the tread or softer rubber portion of the tire, and the base, or hard rubber portion are placed a number of venting elements in the form of strings, tapes, or other suitable devices 7, in the same manner as between the base and the rim.

When the tire and rim are placed in the mold and the mold placed in the vulcanizing press, the heat and pressure cause the entrapped air between the base and the rim and between the main portion of the tire and the base, to seek an outlet, which is furnished by the loosely woven or porous venting elements and no blisters or bubbles will be found in the finished tire.

It is obvious that different ways of accomplishing the purpose of this invention may be devised, while the description herein has been more or less specific to the mode of venting herein described, variations may be made within the scope of the invention.

I claim:

1. In the process of manufacturing articles of rubber or similar material, the step of providing spaced venting elements along which an entrapped fluid may find outlet from the interior of the article during vulcanization.

2. In the process of manufacturing articles of rubber or similar material, the step of embedding spaced elements in the article which form vents through which air or other fluid which may be entrapped within the interior of the article may find an escape during vulcanization.

3. In the process of manufacturing articles of rubber or similar material, the step of embedding spaced porous elements in the article, which elements lead from the interior of the article to the outside thereof, and furnish vents through which air entrapped within the article may find an escape during vulcanization.

4. In the process of manufacturing articles of rubber or similar material, the step of embedding an isolated string in said article, the said string being of a structure such as to afford an exit from the interior of the article to the outside thereof to vent the entrapped air within the article.

5. In the process of manufacturing articles of rubber or similar material, the step of inserting an isolated venting element provided with interstices, which lead from the interior of the article to the outside thereof, affording an exit for air or other fluid present in the article.

6. In the process of manufacturing solid tires which are vulcanized to a metallic rim, the step of inserting a venting element between the base of the tire and the rim, leading from the center of the base to the outside of the tire, affording an exit for entrapped air or other fluid during vulcanization.

7. In the process of manufacturing solid tires which are vulcanized to a metallic rim, the step of providing a vent from the region where the base joins the rim to the exterior whereby air entrapped in that region may escape during vulcanization.

8. In the process of manufacturing solid tires comprising a rim, a "hard base" and a tread portion, the step of providing vents from the spaces between the rim and the "hard base" to the exterior, whereby entrapped fluids may escape during vulcanization.

9. In the process of manufacturing solid tires comprising a rim, a "hard base" and a tread portion, the step of providing vents from the spaces between the "hard base" and the rim and tread portion, respectively, whereby entrapped fluids may escape during vulcanization.

10. In the process of manufacturing solid tires comprising a rim, and layers of rubber, secured to said rim by vulcanization, the step of inserting between the rim and the rubber tire a venting element, which leads from the interior of the tire to the outside thereof, and along which fluid entrapped between the tire and the rim may escape during vulcanization.

11. In the process of manufacturing solid tires, comprising a metallic rim formed with irregularities on its outer surface, and a rubber tire secured to said rim by vulcanization, the step of placing over said irregularities and under the rubber, a venting element leading from the center of the rim to the exterior thereof along which fluid entrapped within the tire may find an exit during vulcanization.

12. In the process of manufacturing solid tires, comprising a metallic rim having grooves on its outer face and a rubber tire secured to said rim by vulcanization, the step of placing over said grooves a porous venting element which leads from the center of the tire to the exterior thereof and by means of which an exit is afforded for entrapped air from beneath the tire.

13. In the process of manufacturing solid tires comprising a metallic rim having grooves on its outer face, a hard rubber base adjacent said rim and a tread portion, the step of inserting between said base and said rim a string the structure of which is such as to afford an exit from the region between the base and the rim through which air entrapped next to the rim may escape during vulcanization.

14. In the process of manufacturing solid tires comprising a metallic rim, a layer of hard rubber and a tread portion, the step of providing venting elements between the rim and the hard rubber, and the hard rubber and the tread portion which afford exits for entrapped air to the exterior of the tire.

15. In the process of manufacturing articles comprising layers of rubber having different characteristics the step of inserting between the layers of rubber venting elements which afford a means of exit from the region between the layers through which air entrapped may escape and the said venting elements being isolated so as not to prevent a firm union between the two layers during vulcanization.

16. In the process of manufacturing solid tires comprising layers of rubber, the step of inserting between the layers of rubber strings whose structure provides interstices which afford vents through which air entrapped between the layers may escape during vulcanization.

17. In the process of manufacturing solid tires comprising a metallic rim, a "hard base" and a tread portion, the step of embedding in the body of the tire and between the tire and the rim venting elements of porous structure through which air entrapped on either side of the "hard base" may escape during vulcanization.

18. In the process of manufacturing solid tires comprising a metallic rim, a "hard base" and a tread portion, the step of inserting between the "hard base" and the rim and between the "hard base" and the tread portion, a plurality of strings which afford a means of escape for air entrapped in the center of the tire.

19. In the process of manufacturing solid tires comprising a metallic rim, a "hard base" and a tread portion, the step of laying strings transversely of said tire on the sides of said "hard base," the strings leading from the interior of the tire to the exterior thereof and venting the space between the several parts of the tire.

20. In the process of manufacturing solid tires comprising a metallic rim, the upper surface of which is provided with irregularities, a "hard base" and a tread portion, the step of laying strings transversely of said tires between said rim and said "hard base" and between said "hard base" and said tread portion, said strings leading from the interior of the tire to the exterior thereof and venting the spaces between the several parts of the tire.

DANIEL E. GOODENBERGER.